US006769021B1

(12) United States Patent
Bradley (10) Patent No.: US 6,769,021 B1
(45) Date of Patent: Jul. 27, 2004

(54) METHODS FOR PARTITIONING END NODES IN A NETWORK FABRIC

(75) Inventor: Mark W. Bradley, Boulder, CO (US)

(73) Assignee: Adaptec, Inc., Milpitas, CA (US)

( * ) Notice: Subject to any disclaimer, the term of this patent is extended or adjusted under 35 U.S.C. 154(b) by 787 days.

(21) Appl. No.: 09/613,174

(22) Filed: Jul. 10, 2000

Related U.S. Application Data (60) Provisional application No. 60/154,150, filed on Sep. 15, 1999, and provisional application No. 60/179,757, filed on Feb. 2, 2000.

(51) Int. Cl.$^7$ ............................................. G06F 15/177
(52) U.S. Cl. ........................ 709/220; 709/222; 710/104
(58) Field of Search ................................. 709/200–202, 709/220–222, 230, 238; 710/10, 104, 105

(56) References Cited

U.S. PATENT DOCUMENTS

| | | | | |
|---|---|---|---|---|
| 6,434,447 B1 | * | 8/2002 | Shteyn | 709/220 |
| 6,434,612 B1 | * | 8/2002 | Hughes et al. | 709/223 |
| 6,487,628 B1 | * | 11/2002 | Duong et al. | 710/313 |
| 6,618,764 B1 | * | 9/2003 | Shteyn | 709/249 |
| 6,646,984 B1 | * | 11/2003 | Mehra et al. | 370/220 |
| 6,691,160 B1 | * | 2/2004 | Bradley | 709/220 |

* cited by examiner

Primary Examiner—Bharat Barot
(74) Attorney, Agent, or Firm—Martine & Penilla, LLP (57) ABSTRACT

A method for partitioning end nodes on a fabric is provided. The method includes configuring a storageless host on the fabric. The storageless host is configured by loading a programming media which has host programming code onto the host. The host programming code is configured to provide the storageless host access to the fabric. The method also includes searching for available end nodes that are connected to the same fabric as the host. After available end nodes are discovered on the fabric, the user selects a desired available end node which is connected to a storage device. The desired available end node is associated with the host on the fabric after the user selects the desired available end node. A management function then installs a partitioning key at the desired available end node and a matching partitioning key at the host. The matching partitioning key installed at the host matches the partitioning key installed at the desired available end node. When the partitioning key is installed at the desired available end node, only a host having a matching partitioning key may communicate with the desired available and end node. Once the partitioning keys are installed, an operating system (OS) from the programming media can be loaded onto the storage device over the fabric. Normal operation of the host from the remotely loaded OS can occur as if the OS were loaded locally to the host, e.g., such as a local hard drive.

22 Claims, 8 Drawing Sheets

METHODS FOR PARTITIONING END NODES IN A NETWORK FABRIC

CROSS REFERENCE TO RELATED APPLICATIONS

This application is related to the following U.S. patent application entitled "Input/Output Communication Networks and Booting Protocols," having U.S. patent application Ser. No. 09/552,289, filed on Apr. 19, 2000, now U.S. Pat. No. 6,691,160, which is hereby incorporated by reference. The present application also claims priority benefit of U.S. Provisional Application No. 60/179,757, filed on Feb. 2, 2000, which is incorporated herein by reference. In addition, the present application claims priority benefit of U.S. Provisional Application No. 60/154,150, filed on Sep. 15, 1999, which is incorporated herein by reference.

BACKGROUND OF THE INVENTION

1. Field of the Invention

This invention relates generally to partitioning within switched fabrics, and more particularly to the association of one end node on a switched fabric with another end node on the same switched fabric.

2. Description of the Related Art

Today's computers are becoming more interactive with other computers in a networking environment. This includes the ability for computers to communicate with other computers on a given network, such as a local area network (LAN). As computers communicate, they are able to access files located on different computers. For example, using a well known networking transport such as Ethernet, one computer is able to access data stored on drives of other computers. Such drives have interfaces such as small computer system interface (SCSI) hard drives, IDE hard drives, SCSI or IDE optical disc drives (e.g., CDs, CD-Rs, CD-R/W, and DVDs), etc.

Computers typically communicate over a network through host adapters (e.g., network interface cards "NICs") that allow the computer to interface with the local area networks. The NICs can implement different types of network technologies such as Ethernet, ATM (Asynchronous Transfer Mode), Fibre Channel, and the like. Furthermore, ATM is able to integrate various communication technologies such as LAN and WAN (wide area network) and other voice and transmission networks, thereby creating a unified digital network, or fabric, where all the previously mentioned networks are accessible by one host. Through the local area networks and ATM, hosts are able to communicate with other hosts and any shared peripheral devices associated with other hosts, such as a host computer's RAID device. Thus, all users on a network may access data stored on other hosts and the peripheral devices associated with another host. As such, this creates obvious potential security risks in that one user may access another user's drive and alter any data the user may have saved to that particular drive. By way of example, reference is now made to FIG. 1.

Figure 1:
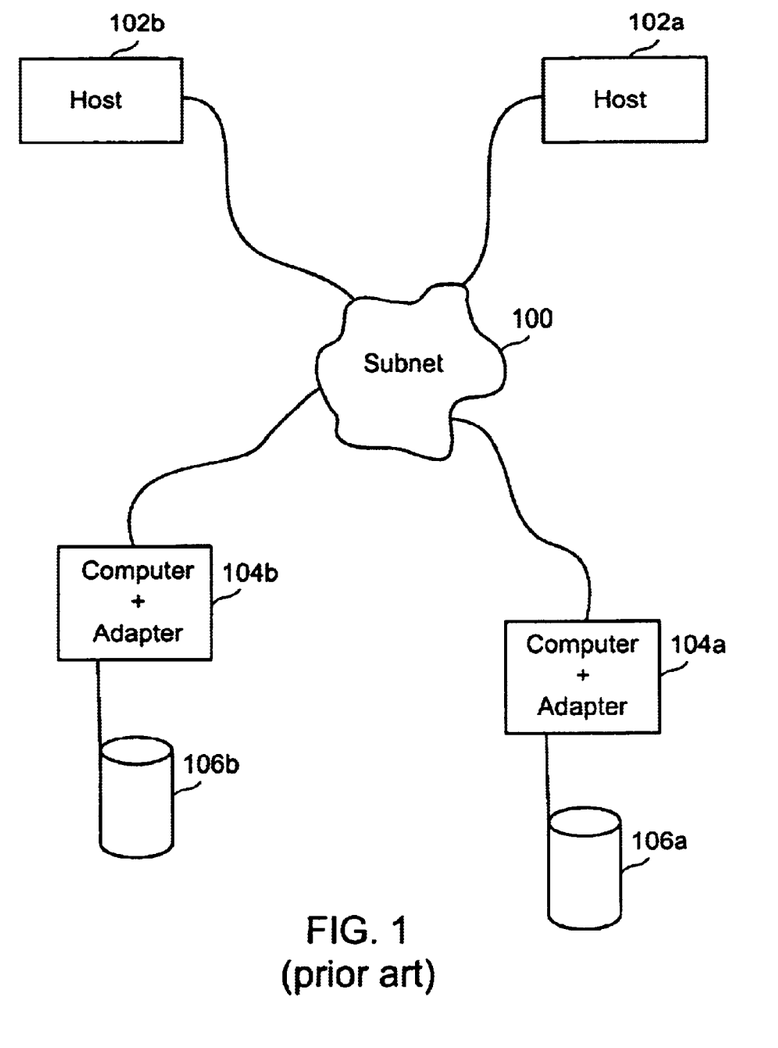
FIG. 1 shows a prior art subnet with hosts connected to the subnet.

FIG. 1 shows a prior art subnet 100 with hosts 102a and 102b connected to the subnet 100. Also connected to the subnet 100 are computers (e.g., having SCSI host adapters or the like) 104a and 104b and associated storage nodes (i.e., RAID device) 106a and 106b. The subnet 100 is a shared fabric environment which allows communication between all users connected to the subnet 100. The hosts 102a and 102b each contain NIC's or similar communication circuitry which facilitate communication between the hosts 102a and 102b and the subnet 100. As such, the hosts 102a and 102b are able to communicate with each other and with the other devices on the subnet 100, such as the storage nodes 106a and 106b. In the networking environment of the subnet 100, the host 102a is not partitioned from the other devices on the subnet 100. Hence, other hosts, such as host 102b, are able to access the host's 102a internal storage (e.g., hard drive). In addition, the storage nodes 106a and 106b attached to the computers 104a and 104b are not partitioned from other devices on the subnet 100. Thus, data stored on the storage nodes 106a and 106b is accessible by all users on the subnet 100. A configuration such as this poses obvious security problems since users on the host 102b may access the data stored by a user on the host 102a and view, copy or alter the data written by a user on the host 102a. Furthermore, in the shared fabric environment of FIG. 1, it is unclear which host 102a and 102b is meant to be associated with which computer 104a and 104b.

In addition, often times LAN administrators opt to consolidate completely independent systems onto one network similar to the subnet 100 in FIG. 1. Administrators typically employ this approach due to space considerations, ease of physical administration, such as updating operating systems and performing periodic data file back-ups; and other administrative considerations. The systems using the same network may be either heterogeneous or homogeneous. Also, the operation of one system or the failure of one system should not affect the performance of another system. Nonetheless, in a networking environment where independent systems share the same network, one independent system may access another independent system through the network, thus creating the same problems described with reference to FIG. 1.

In view of the foregoing, there is a need for a method which partitions devices on a shared networking environment such that the partitioned devices are isolated from other shared devices on the networking environment, in addition, there is a need for a method which controls access to devices connected to a shared networking environment.

SUMMARY OF THE INVENTION

Broadly speaking, the present invention fills the aforementioned needs by providing methods and apparatus for partitioning devices on a shared networking environment. It should be appreciated that the present invention can be implemented in numerous ways, including as a process, an apparatus, a system, a device, a method, or a computer readable media. Several embodiments of the present invention are described below.

In one embodiment, a method for partitioning end nodes on a fabric is disclosed. The method comprises configuring a storageless host on the fabric by loading a programming media having host programming code. The host programming code is configured to provide the storageless host access to the fabric. The fabric is then searched for available end nodes. After available end nodes are found on the fabric, a desired available end node which has a storage device connected thereto is selected using the host programming code. Once a desired available end node is selected, the desired available end node is associated with the host on the fabric. An operating system from the programming media is then loaded to the storage device over the fabric.

In another embodiment, a method for associating end nodes on a fabric is disclosed. The method comprises accessing a programming media that has an installation tool which assists in connecting an initiator end node to the fabric. The installation tool also includes a management function. After the programming media is accessed, a search is done on the fabric for available target end nodes which are connected to the fabric, where at least one of the available target end nodes is connected to a storage device. The method then associates the initiator end node with a remotely located selected available target end node that is connected to a storage device. When the initiator end node is associated with the selected available target end node, an operating system is copied using the programming media onto the storage device of the selected available target end node. Once the operating system is copied onto the storage device of the selected available target end node, the initiator end node is operated using the operating system that is copied to the storage device of the selected available target end node.

The advantages of the present invention are numerous. Most notably, the present invention allows the association of a remotely located storage device with a host in a way that an unauthorized user is prevented from accessing the same storage device (or particular partitions of the same storage device). Furthermore, the present invention allows a user to operate a storageless host using the storage of an end node connected to a fabric. The end node preferably has a storage device that can be accessed by the storageless host as if the storage were local to the host. A system for installing partitioning keys (PKeys) ensures that only authorized hosts/end nodes can gain access to selected storage media. Those hosts/end nodes without proper Pkeys are prevented from accessing selected hosts/end nodes and any devices connected thereto. As such, the systems and methods of the present invention provide users desiring to interconnect and network hosts and end nodes can do so without fear of security breaches common when users connected to a same subnet access data that is confidential to another user.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for a method of partitioning end nodes on a fabric and controlling access to the partitioned end nodes is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention uses a new type of fabric, future input/output (Future I/O), to interface with end nodes. In a subnet, it is possible to have 64K nodes, where a node can be a host, an I/O adapter, a switch, or the like. Future I/O is a switched fabric architecture that enables routing to other fabrics, such as Ethernet, ATM and FDDI, using the well known Internet Protocol (IP). Thus, Future I/O can accommodate N*64K nodes. Additionally, the Future I/O fabric is able to run at speeds of 1 GB/second or greater while accommodating a great amount of traffic in a shared fabric environment.

Communication is facilitated in the Future I/O fabric by enabling hosts to exchange memory-to-memory block I/O based messages and non-block I/O based messages (e.g., when communicating to tape drives and the like) to logically remote end nodes that are also connected to the Future I/O fabric. As mentioned above, the logically remote end nodes include hosts, I/O adapters, switches, and the like. The logically remote end nodes preferably have some type of storage media connected thereto (e.g., a hard disk drive, a tape drive, a RAID array, etc.). The host can communicate directly with any end node using message based I/O reads and I/O writes independent of file systems. Also, since the host is able to complete memory-to-memory communication, Future I/O does not require a microprocessor with an OS of a remote computer to assist in the communication as is needed in (T)FTP transfers.

In addition, the present invention relates generally to partitioning within the above described Future I/O fabric. Within the Future I/O fabric, partitioning is the logical association of two or more end nodes in a fabric for the purpose of enabling communication between those end nodes. The association of the two end nodes with each other facilitates communication between each of the end nodes. An end node may be a Future I/O adapter (i.e., peripheral devices such as RAID controllers) or a computer system, where the computer system may be a single entity or a cluster of single entities such as a storage area network (SAN). In a partitioned environment, a Future I/O fabric may contain a single partition or multiple partitions in accordance with embodiments of the present invention. In a single partition orientation, all the end nodes in the Future I/O fabric are associated with one another. In an orientation where a multiple partitions are used, the fabric contains a multitude of single partitions where end nodes in each single partition operate independently of end nodes located in other single partitions.

Partitioning supports the transparent isolation of resources between defined partition member sets without regard to partition topology. In the context of partitioning, transparent refers to the ability of software, including operating systems, device drivers and applications, which operate in the single partition orientation described above, to operate in the multiple partition orientation described above as if the software was still operating in the single partition orientation. The software may operate in the multiple partition orientation regardless of whether or not the software is aware of other software and end nodes operating in other partitions. Isolation means that the operation of software, firmware and hardware in one partition does not affect the operation of software, firmware or hardware in another partition. Thus, abnormal behavior, such as bugs, crashes, etc. in one partition will not affect the operation of software, hardware or firmware located in another partition on the same Future I/O fabric.

Figure 2A:
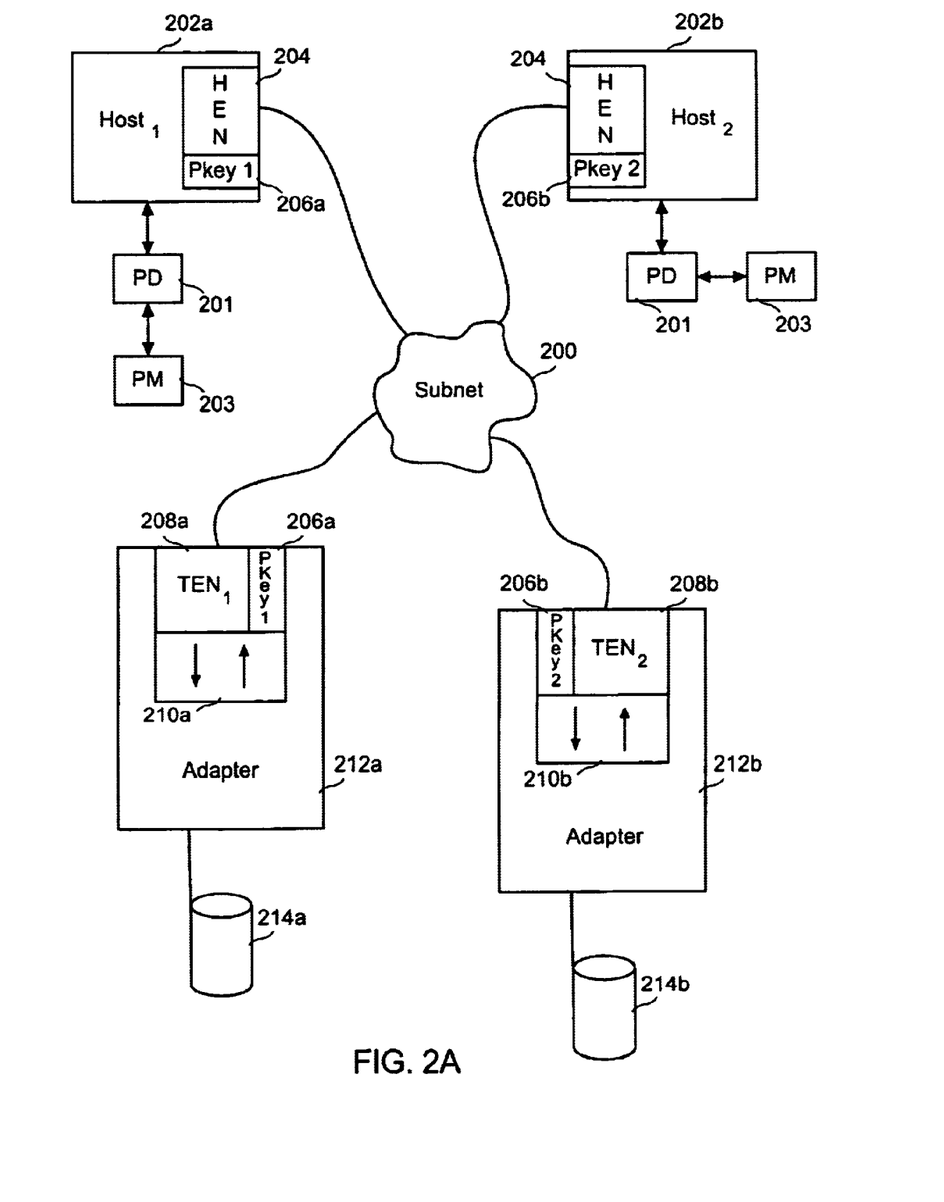
FIG. 2A shows a partitioned subnet in accordance with one embodiment of the present invention.

Now making reference to the drawings, and more particularly to FIG. 2A, FIG. 2A shows a partitioned subnet 200 in accordance with one embodiment of the present invention. In one embodiment of the present invention, the subnet 200 uses the Future I/O fabric previously described above to connect end nodes, such as a host 202a (HOST$_1$) and a host 202b (HOST$_2$), and other end nodes, such as end nodes 212a and 212b to the subnet 200. The hosts 202a and 202b are any type of processing device, including a personal computer, or any other device which includes at least a processor and memory, such that the hosts 202a and 202b may be storageless hosts. The hosts 202a and 202b contain a host end node logic 204 (HEN) which allows the hosts 202a and 202b to connect to the Future I/O fabric of the subnet 200.

In addition, the host 202a contains a partition key (PKey1) 206a installed on the host end node logic 204 of the host 202a and the host 202b contains a PKey2 206b which is also installed on the host end node logic 204 of the host 202b. The PKey1 206a and the PKey2 206b allow the hosts 202a and 202b to communicate with other end nodes on the subnet 200, such as the end nodes 212a and 212b and the storage devices 214a and 214b connected to the end nodes 212a and 212b. The PKey1 206a allows the host 202a to communicate with the end node 212a and the storage device 214a. The PKey2 206b allows the host 202b to communicate with the end node 212b and the storage device 214b.

In one embodiment, the PKey1 206a and the PKey2 206b are 32 bit key values which are unique to each PKey in a single partition. As such, a 32 bit key value for the PKey1 206a is different from a 32 bit key value for the PKey2 206b. It should be noted that the 32 bit key value is also unique within a particular subnet. Thus, in a network environment where multiple partitions containing single partitions which co-exist as previously described, a 32 bit key value for a PKey on one single partitioned first subnet may be the same as a 32 bit key value for a PKey on another single partitioned second subnet which co-exists with the first subnet since the subnets do not share end nodes. As will be discussed with reference to FIG. 2C, the PKey1 206a and the PKey2 206b are installed on the hosts 202a and 202b by a management function. The hosts 202a and 202b also contain a peripheral device (PD) 201 and a programming media (PM) 203, which will be discussed in further detail with respect to FIG. 2B.

Also shown in FIG. 2A are end nodes 212a and 212b. The end node 212a contains a target end node logic 208a, the PKey1 206a, a resource 210a and the storage device 214a. The target end node logic 208a (TEN$_1$) allows the end node 212a to connect to the Future I/O fabric of the subnet 200. The PKey1 206a is the same 32 bit key value as the PKey1 206a contained within the host 202a. Therefore, the host 202a is the only end node able to communicate with the end node 212a since the PKey of the host 202a matches the PKey of the end node 212a. As will be discussed with reference to FIG. 2C, the PKey1 206a is installed on the target end node logic 208a by a management function. The resource 210a allows the host 202a to access the storage device 214a by facilitating I/O to the storage device 214a. In one embodiment, the resource 210a may be a queue pair (QP) where an input queue allows access to the storage device 214a from the end node 212a and an output queue allows access to the end node 212a from the storage device 214a. In another embodiment, the resource 210a may use a first-in, first-out (FIFO) approach to access the storage device 214a from the end node 212a. The storage device 214a is a device capable of storing computer readable data, such as a hard drive or a RAID device.

The end node 212b contains a target end node logic (TEN$_2$) 208b, the PKey2 206b, a resource 206b. The storage device 214b is connected to the end node 212b. The target end node logic 208b functions in the same manner as the target end node logic 208a as described above. Thus, the target end node logic 208b facilitates communication between the end node 212b and the Future I/O fabric of the subnet 200. The Pkey2 206b is the same PKey installed in the host 202b as discussed earlier. Thus, the host 202b is Athe only end node which may communicate with the end node 212b since the host 202b contains the PKey2 206b, which matches the 32 bit key value of the PKey2 206b in the target end node logic 208b. As will be further discussed with reference to FIG. 2C, a management function installs the PKey2 206b onto the target end node logic 208b of the end node 212b. The resource 206b is similar to the resource 210a described with reference to the end node 212a. As such, the resource 206b facilitates access to the storage device 214b. The storage device 214b is similar to the storage device 214a described above.

Figure 2B:
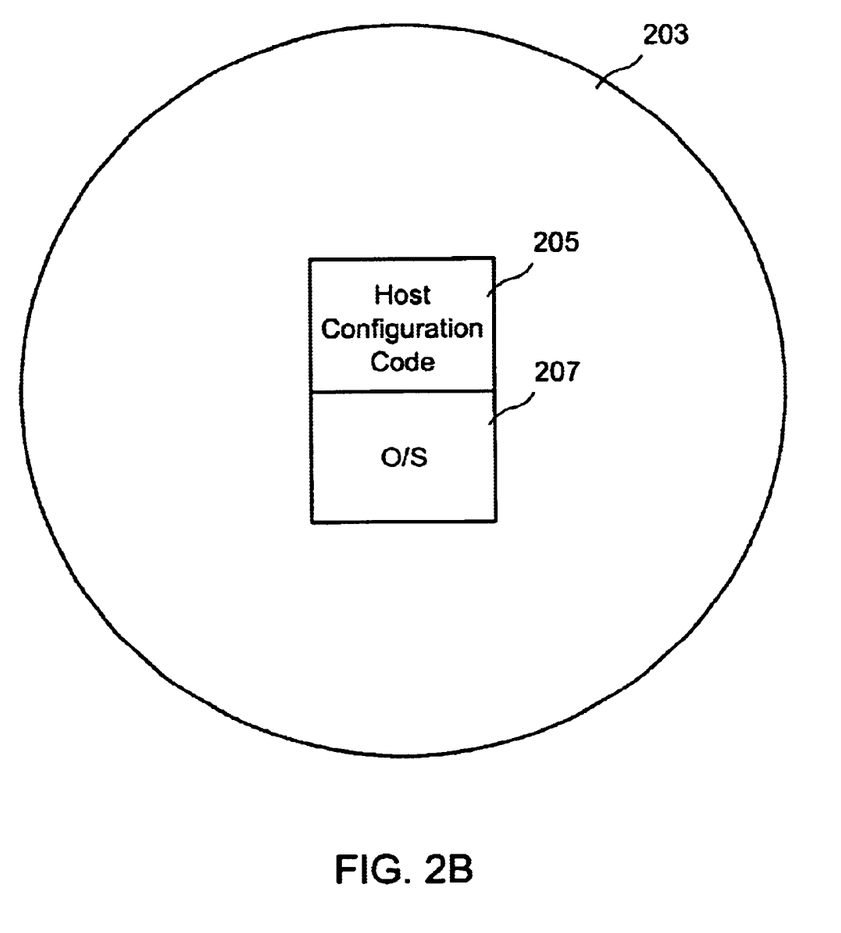
FIG. 2B shows a programming media in accordance with one embodiment of the present invention.

FIG. 2B shows the programming media 203 in accordance with one embodiment of the present invention. The programming media 203 includes, as digital data, a host configuration code 205 and an operating system (O/S) 207. In one embodiment, the programming media 203 is a CD-ROM, in another embodiment, the programming media 203 may be a diskette or any other suitable media that can store digital data. It should also be noted that the programming media may be a remote source, such as the internet, where the host 202a is able to access a host configuration code and an O/S from the internet using a NIC, a modem line, a cable line, fiber optic line or a DSL line, in accordance with another embodiment of the present invention. The programming media 203 is an installation tool which contains the management function. Once the installation tool is loaded, the subnet 200 is searched to find available sources to install the O/S for the host 202a. After available end nodes are found on the subnet, the user is asked what source the user would like to use to store the O/S for the host. During operation of the host 202a, the O/S is retrieved from the selected source. The user selects a source using an user interface, as shown with reference to FIG. 2C.

Figure 2C:
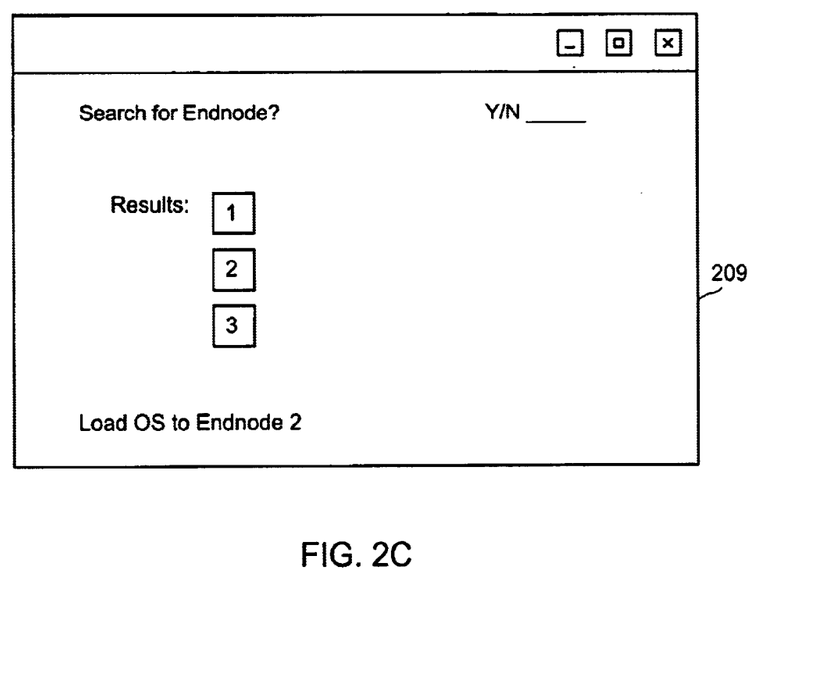
FIG. 2C shows a graphic user interface (GUI) for selecting end nodes on a subnet, in accordance with one embodiment of the present invention.

FIG. 2C shows a graphic user interface (GUI) 209 for selecting end nodes on the subnet, in accordance with one embodiment of the present invention. After the programming media 203 is read by the host, the management function generates the (G)UI 209. The (G)UI 209 asks the user if the user wants to search for an end node. When the user requests to search for an end node on the subnet, the subnet is searched for available end nodes. After available end nodes are found on the subnet, the available end nodes are listed for the user, as shown in FIG. 2C. In FIG. 2C, three end nodes were found, as denoted by the numbers 1, 2, and 3. In this example, the user selects the end node denoted by the number 2. Once the user selects the end node designated by 2, the management function installs a PKey value on the target end node logic of the end node denoted by the number 2. The management function then installs a matching PKey value on the host end node logic of the host being used by the user. The matching PKey on the host therefore establishes that particular end node as being associated with the host.

Figure 3A:
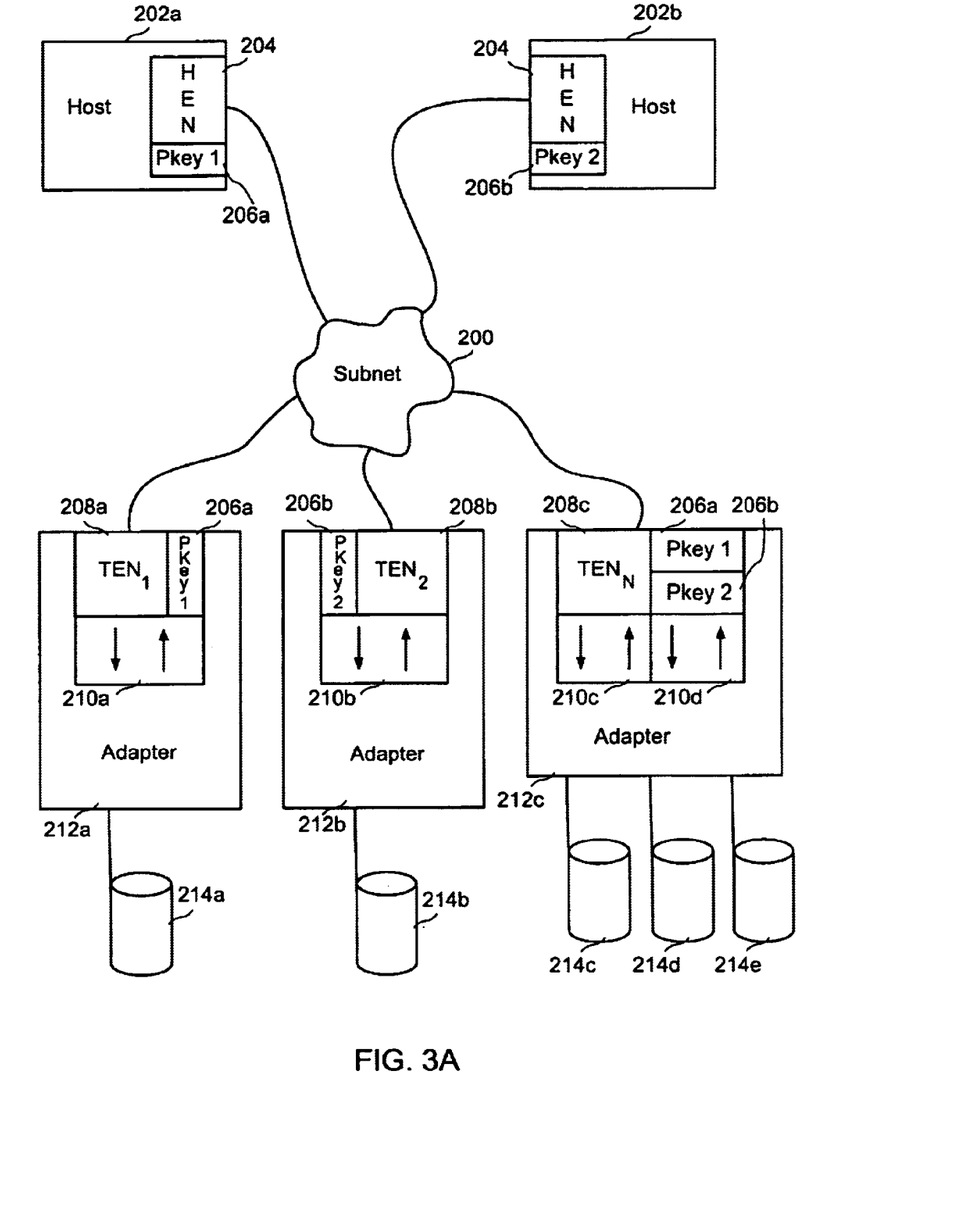
FIG. 3A shows a subnet having an additional partitioned adapter in accordance with one embodiment of the present invention.

FIG. 3A shows the subnet 200 of FIG. 2A having an additional partitioned end node 212c in accordance with one embodiment of the present invention. The end node 212c is an end node on the subnet 200 which contains additional storage devices 214c–214e. The end node 212c includes a target end node logic (TENN) 208c, PKey1 206a, PKey2 206b and resources 210c and 210d. The target end node logic 208c functions in the same manner as the target end node logic 208a described earlier with reference to FIG. 2A. The PKey1 206a of the end node 212c matches the 32 bit key value of the PKey1 206a of the host 202a, as such, the host 202a is able to access to the end node 212c. The PKey2 206b of the end node 212c matches the 32 bit key value of the PKey2 206b of the host 202b. As is the case with the host 202a, the host 202b is also able to access the end node 212c since it has a matching PKey.

Figure 3B:
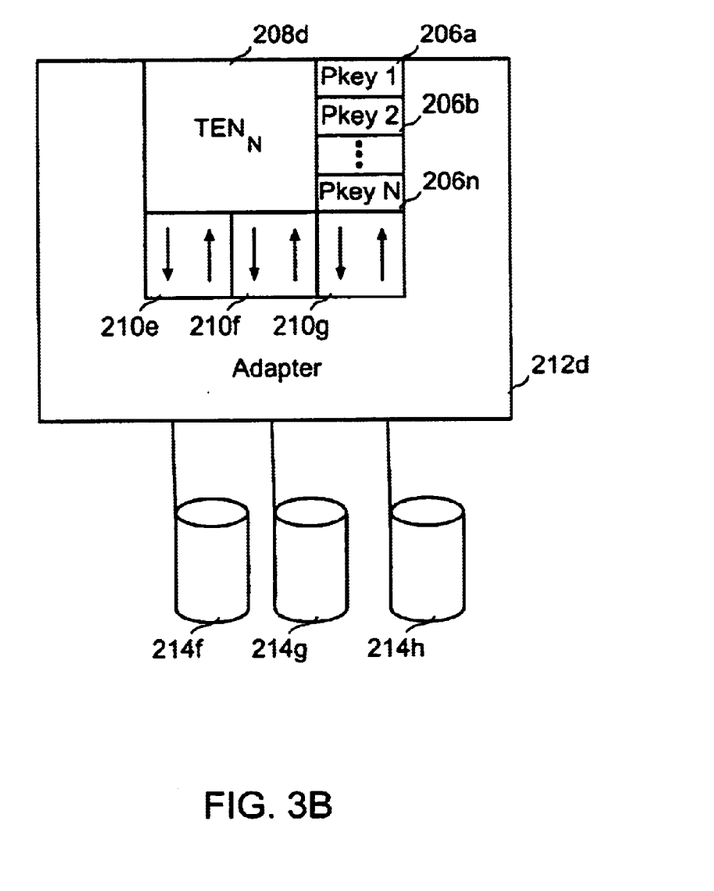
FIG. 3B shows an adapter in accordance with another embodiment of the present invention.

FIG. 3B shows an end node 212d in accordance with another embodiment of the present invention. In this embodiment, the end node 212d is a large, sharable end node which may allocate resources 210e–210g to various hosts (not shown) located on the same subnet (not shown) to which the end node 212d is connected, as will be discussed further. The end node 212d contains a target end node logic (TENN) 208d, PKeys 206a through 206n, resources 210e–210g and storage devices 214f–214h. The target end node logic 208d functions in the same manner as the target end node logic 208a previously described. The 32 bit key value of the PKey1 206a is the same as the 32 bit key value of the PKey1 206a for the host 202a and the 32 bit key value of the PKey2 206b is the same as the 32 bit key value of the PKey2 206b of the host 202b. Thus, the hosts 202a and 202b are able to communicate with the end node 212d. The 32 bit key values for the remaining PKeys correspond to 32 bit key values of the various hosts connected to the subnet, thus in addition to the hosts 202a and 202b communicating with the end node 212d, the other hosts having PKeys which match the remaining PKeys may also communicate with the end node 212d. The storage devices 214f–214h are storage devices capable of storing computer generated data, as described with reference to the storage device 214a of the end node 212a. In an alternative embodiment of the present invention, the end node 212d is capable of having any number of storage devices necessary for various applications. Thus, in one embodiment, if the PKeys 206a through 206n correspond to 10 hosts such as host 202a, the end node 212d may contain 10 or more storage devices which correspond to particular hosts.

The resources 210e–210g are distributed among various hosts connected to the subnet such that each resource is unique to each PKey and the host containing the matching PKey. The resources 210e–210g function in the same manner as the resource 210a described with reference to FIG. 2A. The resources 210e–210g are associated among the hosts which have PKeys that match the PKey1 206a through the PKeyn 206n of the target end node logic 208d and are thus partitioned with the end node 212d. In one embodiment, the end node 212d may allocate all the resources 210e–210g to the PKey1 206a, which matches the PKey1 206a of the end node 212d. In this embodiment, all other hosts, such as the host 202b, which have matching PKeys, are able to communicate with the end node 212d since they are partitioned with the end node 212d.

In one embodiment, multiple resources may access the same storage devices. In this embodiment, the resources 210f and 210g have access to the storage device 214g. As such, the hosts having PKeys which match the PKeys allocated to the resources 210f and 210g will have access to the storage device 214g. For example, if the resource 210f is associated with the PKey1 206a and the resource 210g is associated with the PKey2 206b, the hosts 202a and 202b will both have access to the storage device 214g.

Figure 4:
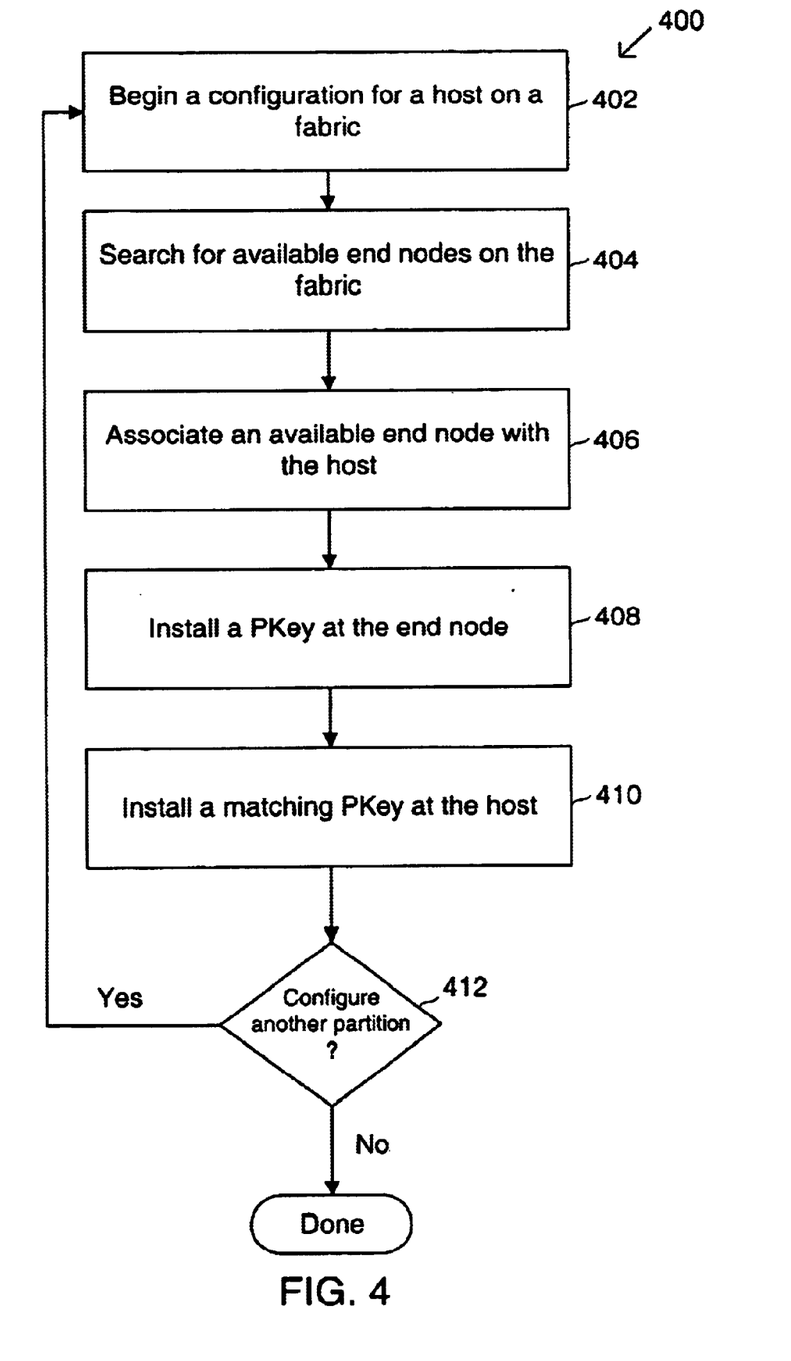
FIG. 4 is a flowchart for partitioning end nodes on a subnet in accordance with one embodiment of the present invention.

FIG. 4 is a flowchart 400 for partitioning end nodes on a subnet in accordance with one embodiment of the present invention. As used herein, partitioning refers to assigning particular hosts connected to a fabric access to particular resources, such as storage devices. The partitioning therefore ensures that only authorized users can gain access to an end node containing their data, while prohibiting access to all other users that may be connected to the fabric. With this in mind, the method begins in operation 402 where a host is configured on a fabric. For example, a host that is powered up for the first time must first be configured to access a fabric and run a particular operating system. In one embodiment, the configuration is done by inserting a programming media, such as a diskette or a CD-ROM, into the host. The programming media contains an operating system which is capable of running the host. In one embodiment, the fabric is the Future I/O fabric previously described. By way of example, making reference to FIG. 2A, the configuration of the host 202a begins in operation 402 by powering up the host 202a for the first time and inserting the programming media 203 into the peripheral device 201, which is attached to the host 202a. For purposes of this example, the host 202a is a storageless host (e.g., no hard disk is locally attached to the host). The programming media 203 contains operating system code capable of running the host 202a after the operating system is loaded onto some storage that is accessible by the host 202a. In operation 404, the method 400 searches for available end nodes on the fabric. The end nodes on the fabric may be adapters having storage devices attached thereto or other hosts on the fabric having hard drives or the like. An end node is available if the target end node logic of the end node does not contain a Pkey or has room for additional PKeys and if management policy endorses the partition. Turning back to the example and FIG. 2A, the programming media 203 includes a partitioning agent which searches for available end nodes on the subnet 200. Once the partitioning agent finds an available end node on the subnet 200, the end node is associated with the host 202a in operation 406 of the method 400.

In FIG. 4, the method 400 associates the end node with the host in operation 406. In the example, the programming media 203 includes a partitioning agent which associates the host 202a of FIG. 2A with the end node 212a. The end node 212a contains the storage device 214a and is capable of storing the operating system of the host 202a. Additionally, in this example, the target end node logic 208a of the end node 212a does not contain a PKey, thus the target end node logic 208a is available and may support a PKey for the host 202a. Once the host 202a is associated the end node 212a in operation 406, the method 400 moves to operation 408.

In operation 408, the method 400 installs a PKey in the end node logic of the associated end node. The PKey may be a 32 bit key, as described earlier with reference to FIG. 2A and PKey1 206a, which allows two end nodes having matching PKeys to communicate with one another. Referring back to the example and FIG. 2A, the management function installs the PKey1 206a in the target end node logic 208a in operation 408 of the method 400. After the PKey is installed in operation 408, the method 400 moves to operation 410 in FIG. 4.

In operation 410, a PKey which matches the PKey resident in the end node is installed in the host. Referring back to the example and FIG. 2A, the management function installs the PKey1 206a in the host end node logic of the host 202a. The PKey1 206a in the host 202a matches the PKey1 206a installed in the target end node logic 208a of the end node 212a such that the host 202a is able to communicate with the end node 212a. Once the PKey is installed in the host the method 400 moves to operation 412. In operation 412, the method determines if another partition is to be configured. If another partition is to be configured, the method 400 will repeat operations 402 through 412 until the desired partitions on the subnet are configured.

Once the desired end nodes on the subnet are partitioned, the method 400 is complete. As previously described, in accordance with one embodiment of the present invention, the host may be storageless, thus the host uses the storage device connected to the end node during normal operation (including running its operating system). Therefore, returning to the example, during the normal operation of the host 202a, the host 202a may use the operating system stored on the storage device 214a of the end node 212a. It should be noted that the end node 212a and the storage device 214a may be remotely located on the subnet 200 from the host 202a. Thus, the operating system of the host 202a is remotely stored, accessed and executed. However, the host 202a will operate as if the OS were installed on a local drive.

Figure 5:
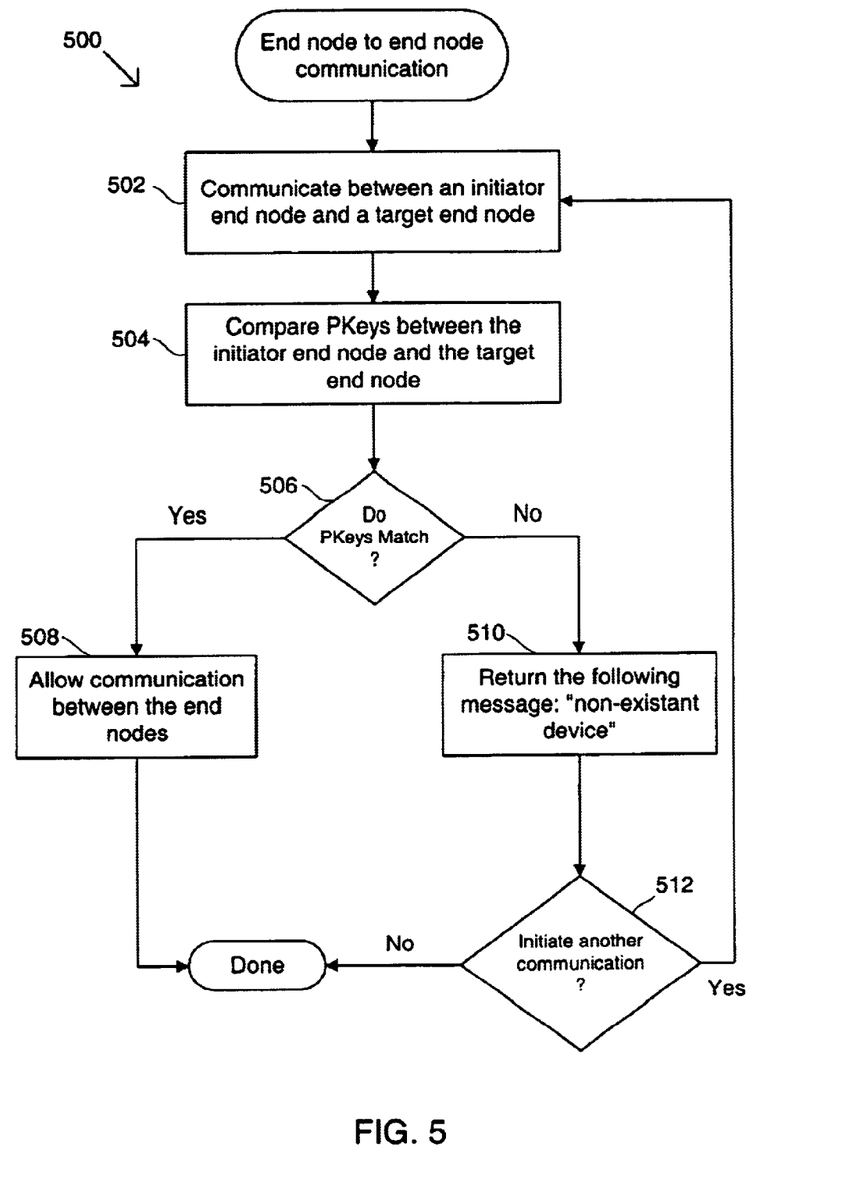
FIG. 5 illustrates a method for end node to end node communication, in accordance with one embodiment of the present invention.

Now making reference to FIG. 5, FIG. 5 illustrates a method 500 for end node to end node communication, in accordance with one embodiment of the present invention. The method 500 first performs operation 502, where an initiator end node communicates with a target end node. It should be understood that the end nodes involved in the communication are not limited to a host and a target, and the communication may also be between two target end nodes on the fabric. In operation 502, an initiator end node on a fabric will initiate contact with another end node located on the fabric. In one embodiment of the present invention, the fabric used by the initiator end node and the target end node is the Future I/O fabric. For example, referring to FIG. 3A, the host 202b is an initiator end node which communicates with the end node 212c, a target end node. After the host 202b communicates with the end node 212c, the method 500 moves to operation 504.

In operation 504, a comparison is made between the PKey of the initiating end node and the target end node. Once the comparison is made between the PKeys, a determination is made in operation 506 if the PKey in the initiator end node matches the PKey in the target end node. If it is determined in operation 506 that the PKey of the initiator end node does not match the PKey of the target end node, the method 500 moves to operation 510, as will be discussed further. If it is determined in operation 506 that the PKey of the initiator end node matches the PKey of the target end node, the method 500 moves to operation 508. Turning back to the example and FIG. 3A, the PKey2 206b of the host 202b is compared with the PKeys of the end node 212c to determine if the PKey2 206b matches any of the PKeys in the target end node logic 208c of the end node 212c. In this example, the end node 212c contains the PKey2 206b in the target end node logic 208c which has the same 32 bit key value as the PKey2 206b in the host 202b. Since the host 202b and the end node 212c contain matching PKeys, the method 500 moves to operation 508.

In operation 508, the initiator end node communicates with the target end node. In the example, the host 202b communicates with the end node 212c. During the communication, the host 202b may access the storage device 214e through the resource 210d. In this example, the resource 210d, which allows access to the storage device 214e, is associated with the PKey2 206b. Therefore, the host 202b is able to store data and access data on the storage device 214e.

Referring back to operation 506, if a determination is made in operation 506 that the PKey of the initiator end node does not match the PKey of the target end node, the method 500 moves to operation 510. In operation 510, the following message may be returned to the user: "non-existent device." The message "non-existent device" is returned for security reasons so that a non-authorized user will not be aware that a device/end node is actually present (when in fact a device does exist but no access is granted). For example, referring to FIG. 3A, if the host 202b attempts communication with the end node 212a, the method 500 in operations 504 and 506 will determine that the PKey2 206b of the host 202b does not match the PKey1 206a in the target end node logic 208a of the end node 212a. Thus, the method 500 will return the message "non-existent device" in operation 510. As such, a user on host 202b is not aware of the existence of the end node 212a using the method 500. After the host 202b is denied communication with the end node 212a in operation 510, the method 500 moves to operation 512, where a determination is made as to whether another communication between an initiator end node and a target end node should be initiated. If a determination is made that another communication should be initiated, the method 500 reverts back to operation 502 and the method 500 is repeated. If a determination is made in operation 512 that another communication should not be initiated in operation 512, the method 500 is complete.

As can be seen, the embodiments of the present invention restrict communication between various end nodes on the same fabric to those having proper partition keys. Thus, a fabric organized into a subnet may contain numerous end nodes that can have restricted access to each end node. As an end node is configured, the host may associate a storage device attached to another end node on the fabric to store data for the host and restrict access by others through the use of a partition key. Thus, a user may store data to a remote end node located on a subnet with confidence that a another user on the network will be prevented from accessing the data stored on the remote end node since that user will not have the proper partition key to access that particular storage device. Also, communication is restricted between two end nodes that are hosts if the hosts do not contain matching partition keys.

In addition, the present invention allows a user to select an end node to use as a storage device. After all the end nodes available on the fabric are found, the user may select which end node to use for data storage. Thus, this gives the user increased flexibility in selecting a particular end node for storage purposes. Operation from the remote end node will then function as if the remote storage were connected locally to the host.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CDRs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for partitioning end nodes on a in a network fabric, the method comprising:
   configuring a storageless host on the fabric, the storageless host being configured by loading a programming media having host programming code, the host programming code being configured to provide the storageless host access to the network fabric;
   searching for available end nodes connected to the network fabric;
   selecting a desired available end node using the host programming code;
   associating the desired available end node with the storageless host on the network fabric, the desired available end node having a storage device connected thereto; and
   loading an operating system from the programming media to the storage device over the network fabric.

2. A method for partitioning end nodes in a network fabric as recited in claim 1, the method further comprising:
   installing a PKey at the desired available end node; and
   installing a matching PKey at the storageless host, wherein the matching PKey at the storageless host matches the PKey at the desired available end node.

3. A method for partitioning end nodes in a network fabric as recited in claim 2, wherein the PKey and the matching PKey are 32 bit keys.

4. A method for partitioning end nodes in a network fabric as recited in claim 3, the method further comprising:
   determining if another host on the network fabric is to be configured.

5. A method for partitioning end nodes in a network fabric as recited in claim 4, wherein the network fabric is searched for the available end nodes after the storageless host is booted.

6. A method for partitioning end nodes in a network fabric as recited in claim 5, wherein the desired available end node becomes no longer available after the PKey is installed at the desired available end node.

7. A method for partitioning end nodes in a network fabric as recited in claim 6, wherein the host may not associate an end node that is no longer available.

8. A method for partitioning end nodes in a network fabric as recited in claim 2, further comprising:
   communicating with the desired available end node; and
   comparing the matching PKey at the host with the PKey at the desired available end node.

9. A method for partitioning end nodes in a network fabric as recited in claim 8, further comprising:
   determining if the matching PKey at the storageless host matches the PKey at the desired available end node.

10. A method for partitioning end nodes in a network fabric as recited in claim 9, further comprising:
    allowing communication between the storageless host and the desired available end node if the matching PKey of the host matches the PKey of the desired available end node.

11. A method for partitioning end nodes in a network fabric as recited in claim 1, wherein, the available end node is associated with a plurality of hosts such that the plurality of hosts communicate with the available end node.

12. A method for partitioning end nodes in a network fabric as recited in claim 11, wherein the available end node includes multiple PKeys such that the available end node is able to communicate with the plurality of hosts.

13. A method for associating end nodes in a network fabric, the method comprising:
    accessing a programming media having an installation tool that includes a management function, where the installation tool assists in connecting an initiator end node to the network fabric;
    searching for available target end nodes connected to the network fabric;
    associating the initiator end node with a selected available target end node, the selected available target end node being connected to a storage device which is remotely located from the initiator end node such that associating enable partitioning of the selected available target end node with the initiator end node;
    copying an operating system from the programming media onto the storage device of the selected available target end node; and
    operating the initiator end node using the operating system that is copied to the storage device of the selected available target end node.

14. A method for associating end nodes in a network fabric as recited in claim 13, wherein the initiator end node is storageless.

15. A method for associating end nodes in a network fabric as recited in claim 14, wherein the operation of associating the initiator end node with the selected available target end node further comprises:
    installing a partition key at the selected available target end node using the management function; and
    installing a matching partition key at the initiator end node using the management function, wherein the matching partition key matches the partition key installed at the selected available target end node.

16. A method for associating end nodes in a network fabric as recited in claim 15, wherein the initiator end node communicates with the selected available target end node.

17. A method for associating end nodes in a network fabric as recited in claim 16, wherein the communication between the initiator end node and the selected available target end node further comprises:

comparing the matching partition key of the initiator end node with the partition key of the selected available target end node; and     determining if the matching partition key of the initiator end node matches the partition key of the selected available target end node.

18. A method for associating end nodes in a network fabric as recited in claim 17, wherein the communication between the initiator end node and the selected available target end node further comprises:

allowing communication between the initiator end node and the selected available target end node if the matching partition key of the initiator end node matches the partition key of the selected available target end node.

19. A method for associating end nodes in a network fabric as recited in claim 17, wherein the communication between the initiator end node and the selected available target end node further comprises:

returning a non-existent device message if the matching partition key of the initiator end node does not match the partition key of the selected available target end node.

20. A method for associating end nodes in a network fabric as recited in claim 19, wherein multiple partition keys are installed at the selected available target end node.

21. A method for associating end nodes in a network fabric as recited in claim 20, wherein a second initiator end node having a second matching partition key which matches the second partition key installed at the selected available target end node may communicate with the selected available target end node.

22. A method for associating end nodes in a network fabric as recited in claim 15, further comprising:

determining if another initiator end node on the network fabric is to be configured.

* * * * *